United States Patent Office 2,802,085
Patented Aug. 6, 1957

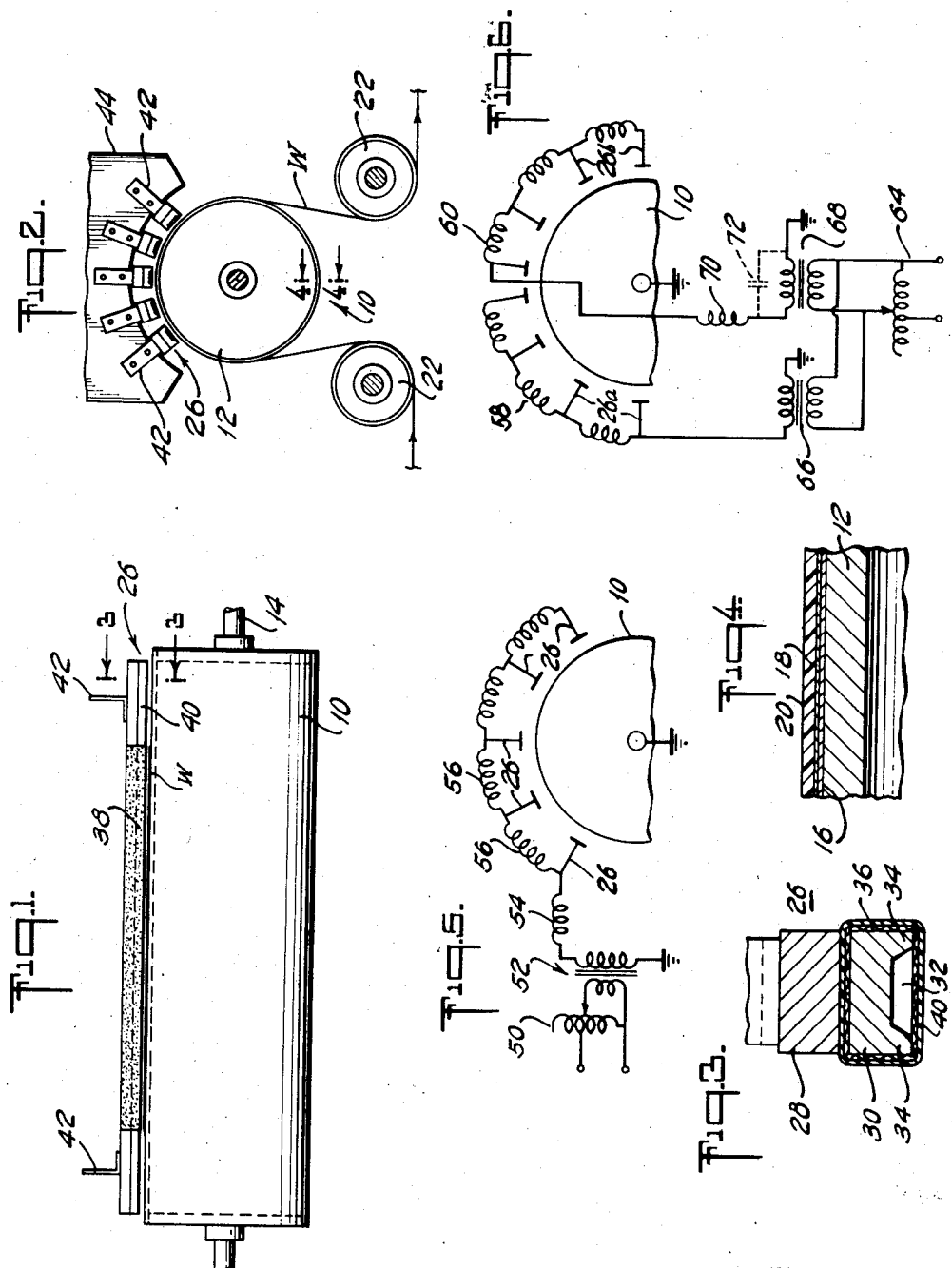

2,802,085

APPARATUS FOR THE TREATMENT OF PLASTIC MATERIALS

Francis Neill Rothacker, East Orange, N. J., assignor to Modern Plastic Machinery Corp., Lodi, N. J., a corporation of Delaware Application November 1, 1955, Serial No. 544,267

6 Claims. (Cl. 219—10.53)

The present invention relates generally to an improved apparatus for the treatment of materials to alter the characteristics thereof, and in particular it relates to an improved apparatus for treating an organic plastic material to increase the adhesive properties thereof and to render its surface suitable for the reception of coatings or copy by printing and other processes.

Many organic plastic materials, such as polyethylene for example, are extremely difficult to print since the surface of the untreated plastic has a low adherency to and compatibility with the conventional inks and other substances which it is often desired to apply thereto. As a consequence, the ink or other substance applied to these plastic surfaces readily wipe or peel off and the results are completely unsatisfactory. There have been proposed and employed many apparatuses to alter the surface characteristics of these plastics to render them receptive, adherent to and compatible with the conventional inks and coatings employed therewith. These processes have been of a chemical, electrical and radiant nature, but have heretofore possessed numerous drawbacks and disadvantages. The chemical treatment of the plastic is expensive and time-consuming and requires considerable equipment. It has been proposed to pass the plastice web, in the case of polyethylene, through or in confrontation with a gas flame to improve its ink reception properties. This method is, however, difficult to control and results in high losses.

The apparatus heretofore employed in electrically treating polyethylene webbing generally consisted of a pair of large area electrodes between which the webbing is advanced. An alternating voltage was applied between the electrodes and was of a value sufficient to effect the treatment of the webbing. This apparatus was highly inefficient, slow and difficult to control. Moreover, the resulting treatment was not uniform and often effected the treatment of portions of the plastic which it was desired to leave intact. As a consequence, heat-sealing of the treated plastic material became difficult, if not impossible, sticking was experienced and other drawbacks resulted.

It is thus a principal object of the present invention to provide an improved apparatus for the treatment of material to alter the characteristics thereof.

Another object of the present invention is to provide an improved apparatus for the treatment of the surface of an organic plastic material to improve the printing and coating properties thereof.

Still another object of the present invention is to provide an improved apparatus for the treatment of the surface of an advancing web of organic material to improve the printing and coating properties thereof.

A further object of the present invention is to provide an improved apparatus for treating the surface of an advancing web of polyethylene to alter the characteristics thereof.

Still a further object of the present invention is to provide an improved apparatus for treating the surface of an advancing web of polyethylene to alter the characteristics thereof, which apparatus is simple, inexpensive and rapid.

The above and other objects of the present invention will became apparent from a reading of the following description taken in conjunction with the accompanying drawing wherein:

Figure 1 is a front elevational view, partially broken away, of an electrode system and web advancing mechanism embodying the present invention;

Figure 2 is a side elevational view thereof;

Figure 3 is an enlarged detailed sectional view taken along line 3—3 in Figure 1;

Figure 4 is an enlarged detailed sectional view taken along line 4—4 in Figure 2;

Figure 5 is a preferred embodiment of an electrical network employed in the present invention; and Figure 6 is a diagrammatic view of another electrical network employed in the present invention.

In a broad sense, the present invention contemplates the provision of an improved apparatus for the treatment of a plastic webbing comprising means for advancing said webbing along a longitudinally extending path, a plurality of longitudinally spaced, transversely extending electrodes disposed substantially along said longitudinal path and means for applying a varying potential of different phase to each of said electrodes.

A feature of the invention also resides in the web guiding mechanism which serves as a ground electrode and includes a rotatable drum having an outer face formed of a highly conductive material whereby to reduce eddy current heating and the degeneration of a plastic layer carried by the drum. Still another feature of the present invention resides in the structure of the stationary electrode which includes a bar having a concave face confronting the drum electrode, the concave face being covered by wire screening which extends along the sides of the bar. The wire screening extending along the sides of the bar is coated with a dielectric material. Moreover, that portion of the face of the electrode which does not confront the webbing being treated is likewise covered with a removable dielectric sheet.

Reference is now made to the drawings, and more particularly to Figures 1 through 4 thereof which illustrate the web guiding mechanism and an electrode structure constituting a preferred embodiment of the present invention wherein the numeral 10 generally designates a cylindrical electrode in the form of a drum by way of which a plastic web W may be continuously advanced. The drum electrode 10 includes a body member 12 formed of steel or like suitable material and carried by a shaft 14 which is rotatably supported by roller bearings or the like. Applied to the cylindrical face of the body member 12 is a relatively thin outer coating 18 of chromium or other corrosion resistant material. The purpose of the copper coating 16 is to provide a low resistance path for eddy currents produced in the electrode 10 whereby to reduce the heating effects thereof and the consequent disadvantages, and the coating of chromium is for corrosion resistance purposes. The coatings 16 and 18 may be electroplated. It should be noted that the body member 12 may be formed of a highly conductive material so as to obviate the need for the copper coating 16 or the outer face of the cylindrical electrode 10 may be formed of a corrosion resistant highly conductive material thereby obviating the need for the two coatings 16 and 18. A layer of a low loss dielectric material 20 covers the outer face of the electrode 10 and may be formed of any suitable material, such as for example, polytetrafluoroethylene, polymonochlorotrifluoroethylene and Mylar, a polyester resin which is a product of the Du Pont plastic division. In accordance with a preferred embodiment of the electrode 10 the layer 20 is formed of Mylar having an .008 inch thickness.

A pair of freely rotatable rollers 22 extend parallel to the electrode 10 and are disposed below the electrode 10 to define a guide for the web W, the web W advancing along the forward lower surface of the trailing roller W around approximately the upper half of the electrode 10 and about the inner lower portion of the leading roller 22. The web W is generally withdrawn from a loaded or freely rotatable spool and is taken up by the conventional windup mechanism, the electrode 10 and the rollers 22 being rotated by the advancing web W.

A plurality of regularly spaced longitudinally extending electrodes 26 are disposed along the upper surface of the electrode 10 and in confronting relationship thereto. Each of the electrodes 26 includes an upper bar 28 formed of an insulating material and of rectangular cross section and a lower bar 30 having an upper flat face confronting the underface of the upper bar 28 and removably secured thereto by suitable separable fasteners such as screws or bolts whereby the confronting faces of the bars 28 and 30 define the jaws of a clamp. The underface of the bottom bar 30 is concave having a groove 32 formed therein separating depending legs 34. A metal wire screen 36, preferably of a fine mesh and formed of nickel or stainless steel is tautly wrapped about the lower bar 30 for the full length thereof, the free edges of the wire screen 36 being tightly engaged between the confronting faces of the bars 28 and 30. The portions of the wire screen 36 extending along the side walls of the lower bar 30 are coated as at 38 with a suitable insulating material, such as for example, Glyptal, a synthetic resin prepared from a polyhydride alcohol, phthalic anhydride or any other low loss insulating coating material. Moreover, the end portions of the electrodes 26, which do not confront and are not effective in treating the web W, have the underface of the wire screening 36 covered with a sheet of low loss dielectric material 40 which for convenience of attachment extends over the sides of the wire screens and have their ends clamped between the confronting faces of the bars 28 and 30. This construction permits the replacement of the dielectric material 40 when different widths of webbing are to be treated by the improved apparatus.

Each of the upper bars 28 is provided with two or more longitudinally spaced brackets 42 which are adjustably secured to longitudinally spaced support members 44 formed of an insulating material. The electrodes 38 are adjustable upon the support members 44 so that the distance between the electrode 10 and the respective electrodes 26 may be varied. It should be noted, that except as hereinafter set forth successive electrodes 26 are insulated one from the other.

Referring now to Figure 5 of the drawing which illustrates a preferred form of electrical network for applying the alternating potentials to the several electrodes 26, the numeral 50 designates an adjustable autotransformer the input to which is connected to a suitable source of alternating current and the output of which is connected to the primary of a stepup transformer 52. One end of the secondary of the stepup transformer 52 is connected to ground and the other end is connected through a matching choke 54 to the first electrode 26. Connected between each of the electrodes 26 is a suitable inductor 56 which together with the capacitance between the electrodes 26 and the electrode 10, the electrode 10 being connected to ground, defines a delay line or phase-shifting network. Thus, an alternating voltage applied to the first electrode 26, as indicated in Figure 5, will appear on the subsequent successive electrodes 26 in a phase-delayed relationship from electrode to electrode. As a result of this arrangement, it has been possible to greatly increase the rate of treating polyethylene webbing without adversely affecting the uniformity or the quality of such treatment. Furthermore, the depth of treatment can be closely controlled and treatment of the underface can be almost completely avoided. It is believed that the plastic webbing is treated only when the alternating potential applied to the electrodes 26 exceeds a predetermined value depending upon the various parameters. Thus, during that portion of the cycle below a predetermined voltage there is no substantial treatment of the web by the corresponding electrode. In order to increase the time of treatment per cycle, it is thus necessary to increase the amplitude of the voltage applied to the electrode 26. However, as the voltage is increased difficulty is encountered in the uniformity of the treatment, the control of the treatment, the intensity of treatment, etc. Moreover, the efficiency is greatly reduced, undesirable ozone production is high, the operating life of the components is reduced and the overall operation of the machine is highly inefficient. These drawbacks have been obviated by reason of the improved method and apparatus of establishing the treating electric field.

As a specific example of the improved apparatus, the electrode 10 is approximately 24 inches long and 8 inches in diameter. The electrodes 26 are approximately the length of the electrode 10 and approximately 1 inch wide, the distance between the confronting faces of the electrodes 26 and 10 being set to approximately .08 inches. The inductors 56 are approximately 2½ millihenry each. The transformer T has a stepup ratio of 220 to 13,000. When the autotransformer 50 is adjusted so that 140 volts are applied to the primary of the transformer 52, it was found that a polyethylene webbing in the form of a flat tubing advancing at the rate of 100 feet per minute resulted in an excellent treatment for the application of printed material thereto without adversely affecting the underface of the polyethylene webbing or adversely affecting the heat-sealing or other properties of the material. The current was approximately 1 ampere and the power consumed approximately 90 watts.

In contrast to the treatment by the improved apparatus, when the inductors 56 were shorted connecting the electrodes 26 together and the same webbing was treated at 100 feet per minute and at the same voltage as the earlier example, the current was 225 amperes and the wattage about 180. This was the optimum voltage value for treating the polyethylene webbing when the electrodes were directly interconnected and the results were far inferior to those realized when treating polyethylene webbing with the improved apparatus as aforesaid. The printing properties and the heat-sealing properties of the webbing were not as good and the uniformity of treatment was low. Furthermore, the power consumed when the electrodes 26 were directly connected was twice as high, thus dictating the need for larger electrical equipment. More important with the present improved apparatus and electrical connections, the control was relatively simple at even much higher speeds at contrasted with the earlier devices where adequate control at much higher speeds is difficult or impossible.

In accordance with another embodiment of the present invention, as illustrated in Figure 6 of the drawing, there are provided two mutually insulated sets of electrodes 26a and 26b. Successive electrodes 26a are interconnected by inductors 58, whereas successive electrodes 26b are interconnected by inductors 60.

An adjustable autotransformer 64 has its input connected to a source of alternating current and its output connected to the primaries of the stepup transformers 66 and 68. One end of the secondary of the transformer 66 is grounded and the other end connected directly to the leading electrode 26a. One end of the secondary of the transformer 68 is likewise grounded and the other end of its secondary connected by way of an inductor 70 to the leading electrode 26b. There is a phase difference between the voltages applied to the electrodes 26a and 26b by reason of the inclusion of the inductor 70 in the circuit of the transformer 68, which with the capacitance 72 of the transformer 68 secondary, forms a phase-shifting network. The difference in phase between the various electrodes 26a and 26b, by reason of the inductors 58 and the inductor 70, is preferably such that the phase difference between the leading electrode 26a and the trailing electrode 26b does not exceed 180 degrees. It has been found that highly improved results are realized when the phase shift between successive electrodes 26, 26a and 26b is of the order of from 5 to 10 degrees. Of course, this may be varied depending on the number of electrodes, the various spacings, the material treated and other parameters.

Where the webbing W being treated is of considerably less width than the electrode 10, the electrodes 26 are provided with the dielectric covering 40. It is preferable that there be a vertical overlapping between the treated webbing W and the dielectric covering 40. For example, in treating a relatively narrow webbing, only a few inches wide an overlap of 2⅛ inches on each side has been found very helpful.

While there have been described and illustrated preferred embodiments of the present invention, it is apparent that numerous alterations and omissions may be made without departing from the spirit thereof.

I claim:

1. An improved apparatus for the treatment of a plastic webbing comprising a rotatable cylinder about which said webbing may be advanced, a plurality of axially extending electrodes disposed and spaced along the circumference of said cylinder and confronting and closely spaced to the surface of said cylinder, a source of alternating voltage having first and second terminals, means connecting said cylinder to said first terminal, and means connecting said second terminal to said electrodes whereby the voltage on said electrodes are of different phase.

2. An improved apparatus in accordance with claim 1, wherein the electrode-connecting means include inductors connected between successive electrodes, said inductors defining with the capacitance between said electrodes and said cylinder a delay line.

3. An improved apparatus in accordance with claim 1, wherein said cylinder has a surface formed of an electrically, highly conductive material having superimposed thereon a layer of dielectric material.

4. An apparatus in accordance with claim 1, wherein each of said electrodes includes a bar having a concave face confronting said cylinder, a wire screen supported across said concave face of said bar and extending along the sides of said bar and a dielectric coating covering said screen along the sides of said bar.

5. An improved apparatus in accordance with claim 1, wherein each of said electrodes includes a bar having a concave face, a wire screen supported across said concave face and a sheet of dielectric material extending across a portion of the face of said screen confronting said cylinder.

6. An improved apparatus for the treatment of a plastic webbing comprising a rotatable cylinder about which said web may be advanced, said cylinder being formed of a relatively poorly conducting metal having its outer surface coated with a relatively highly conducting metal, said outer surface having a superimposed layer of dielectric material, a plurality of axially extending electrodes disposed and spaced along the circumference of said cylinder and confronting and closely spaced to the surface of said cylinder, and means for applying to each of said electrodes a varying potential of different phase.

References Cited in the file of this patent

UNITED STATES PATENTS

| | | |
|---|---|---|
| 2,319,174 | Wilson | May 11, 1943 |
| 2,525,356 | Hoyler | Oct. 10, 1950 |
| 2,582,806 | Nes et al. | Jan. 15, 1952 |
| 2,651,708 | Mason et al. | Sept. 8, 1953 |

FOREIGN PATENTS

| | | |
|---|---|---|
| 632,690 | Great Britain | Nov. 28, 1949 |